(12) United States Patent
Hyoudou et al.

(10) Patent No.: US 9,774,532 B2
(45) Date of Patent: Sep. 26, 2017

(54) INFORMATION PROCESSING SYSTEM, INFORMATION PROCESSING APPARATUS AND CONTROL METHOD OF INFORMATION PROCESSING SYSTEM

(71) Applicant: FUJITSU LIMITED, Kawasaki-shi, Kanagawa (JP)

(72) Inventors: Kazuki Hyoudou, Chofu (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/953,475

(22) Filed: Nov. 30, 2015

(65) Prior Publication Data

US 2016/0218975 A1 Jul. 28, 2016

(30) Foreign Application Priority Data

Jan. 22, 2015 (JP) ................. 2015-010144

(51) Int. Cl.
*H04L 12/743* (2013.01)
*H04L 12/713* (2013.01)

(52) U.S. Cl.
CPC ........ *H04L 45/7453* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 2003/0069973 A1* | 4/2003 | Ganesan | H04L 29/06 709/226 |
| 2014/0241247 A1* | 8/2014 | Kempf | H04L 12/4633 370/328 |
| 2016/0127241 A1* | 5/2016 | Hwang | H04L 47/122 370/237 |
| 2016/0261492 A1* | 9/2016 | Xiao | H04L 41/0686 |

FOREIGN PATENT DOCUMENTS

JP 2014-160907 9/2014

* cited by examiner

*Primary Examiner* — Alex Skripnikov
(74) *Attorney, Agent, or Firm* — Fujitsu Patent Center

(57) ABSTRACT

In an information processing system including a plurality of information processing apparatuses, a first information processing apparatus includes a first memory to store a first destination information table in which destination information and specific destination information are associated, and a first processing circuit to calculate a hash value based on destination information included in a first packet, to search the first destination information table, to select a second information processing apparatus based on the hash value, to generate a second packet by adding the hash value and specifying information, to transmit the second packet to the second information processing apparatus. The second information processing apparatus includes a second memory to store a second destination information table and a second processing circuit to receive the second packet, and to transmit to a destination represented by the specific destination information a third packet converted the second packet.

9 Claims, 21 Drawing Sheets

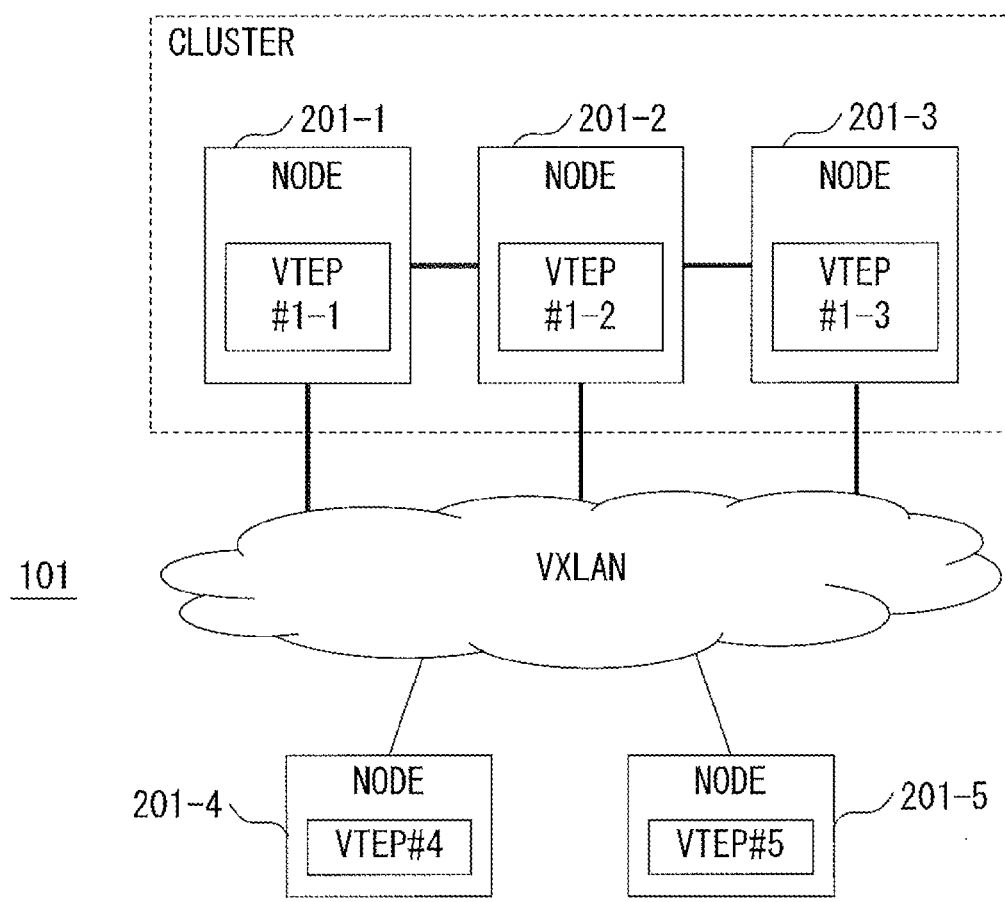
F I G. 1

| INDEX VALUE | NODE ID |
|---|---|
| 0 | 1 |
| 1 | 2 |
| 2 | 3 |
| 3 | 1 |

| ADDRESS | Key | | Value |
|---|---|---|---|
| | TRANSMISSION SOURCE MAC ADDRESS | VLAN ID | VNI |
| 0 | 00:50:FF:04:AC:90 | 10 | 10000 |
| 1 | 00:50:FF:0A:FF:EB | 20 | 10001 |
| 2 | 00:50:FF:56:A0:C1 | 10 | 10001 |
| 3 | 00:50:FF:9A:C0:84 | 20 | 10003 |
| ... | | | |
| M | 00:50:FF:AB:E0:0A | 50 | 20000 |

253-i

| ADDRESS | Key | | Value | |
|---|---|---|---|---|
| | DESTINATION MAC ADDRESS | VNI | DESTINATION VTEP IP ADDRESS | DESTINATION VTEP MAC ADDRESS |
| 0 | 00:50:FF:04:84:A0 | 10001 | 192.168.10.100 | 00:19:8A:EB:88:90 |
| 1 | 00:50:FF:0A:F0:CD | 10000 | 192.168.10.101 | 00:19:8A:CD:40:81 |
| 2 | 00:50:FF:00:00:01 | 20000 | 192.168.10.100 | 00:19:8A:EB:88:90 |
| ... | | | | |
| N | 00:50:FF:AE:40:50 | 10003 | 192.168.10.200 | 00:19:8A:CC:54:32 |

| | Key | | Value |
|---|---|---|---|
| ADDRESS | DESTINATION MAC ADDRESS | VNI | DESTINATION VTEP ID |
| 0 | 00:50:FF:04:84:A0 | 10001 | 0 |
| 1 | 00:50:FF:0A:F0:CD | 10000 | 1 |
| 2 | 00:50:FF:00:00:01 | 20000 | 0 |
| ... | ... | ... | ... |
| N | 00:50:FF:AE:40:50 | 10003 | 100 |

254-i-3

| Key | Value | |
|---|---|---|
| DESTINATION VTEP ID | DESTINATION VTEP IP ADDRESS | DESTINATION VTEP MAC ADDRESS |
| 0 | 192.168.10.100 | 00:19:8A:EB:88:90 |
| 1 | 192.168.10.101 | 00:19:8A:CD:40:81 |
| ... | ... | ... |
| P | | |

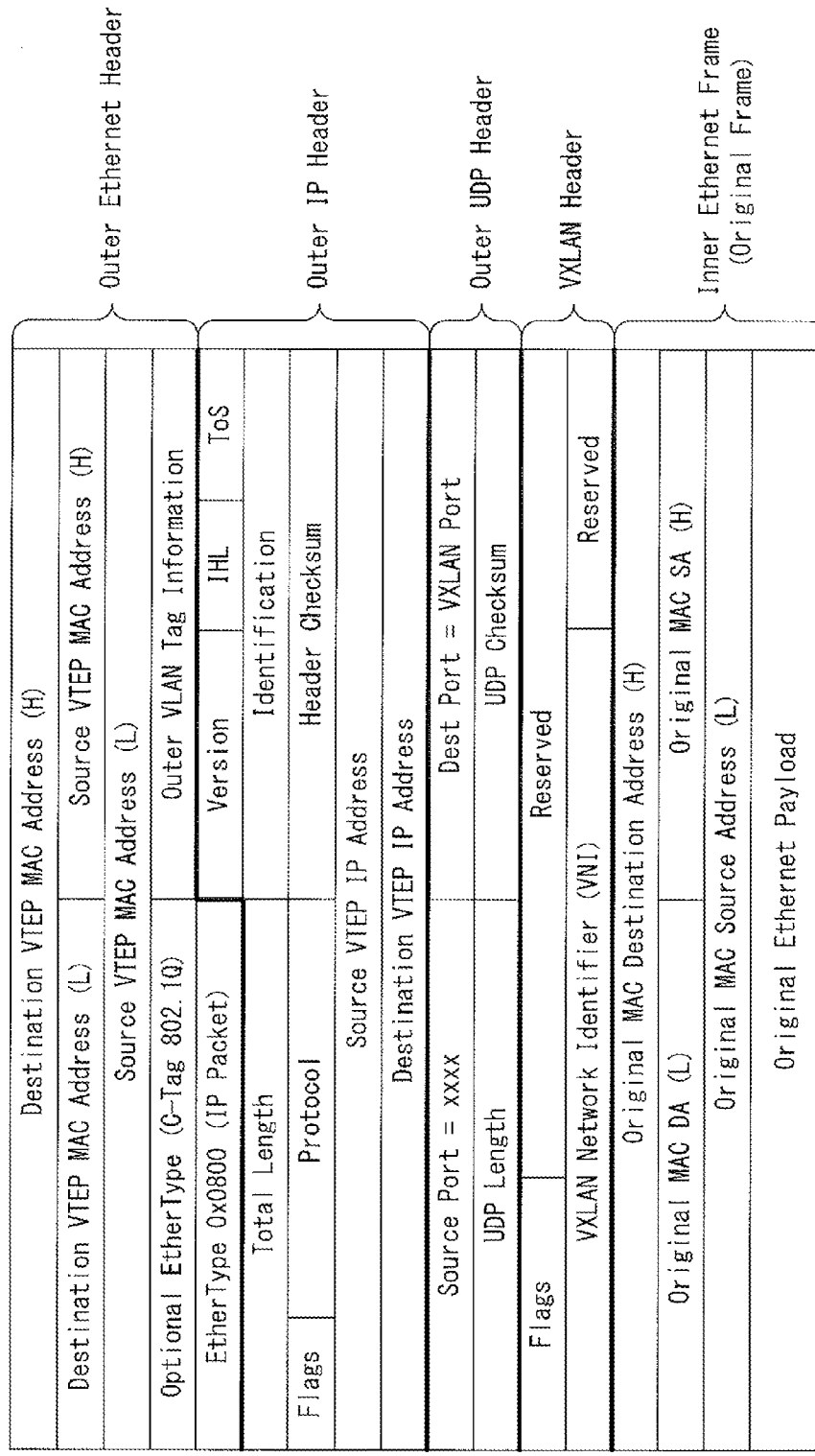
F I G. 9

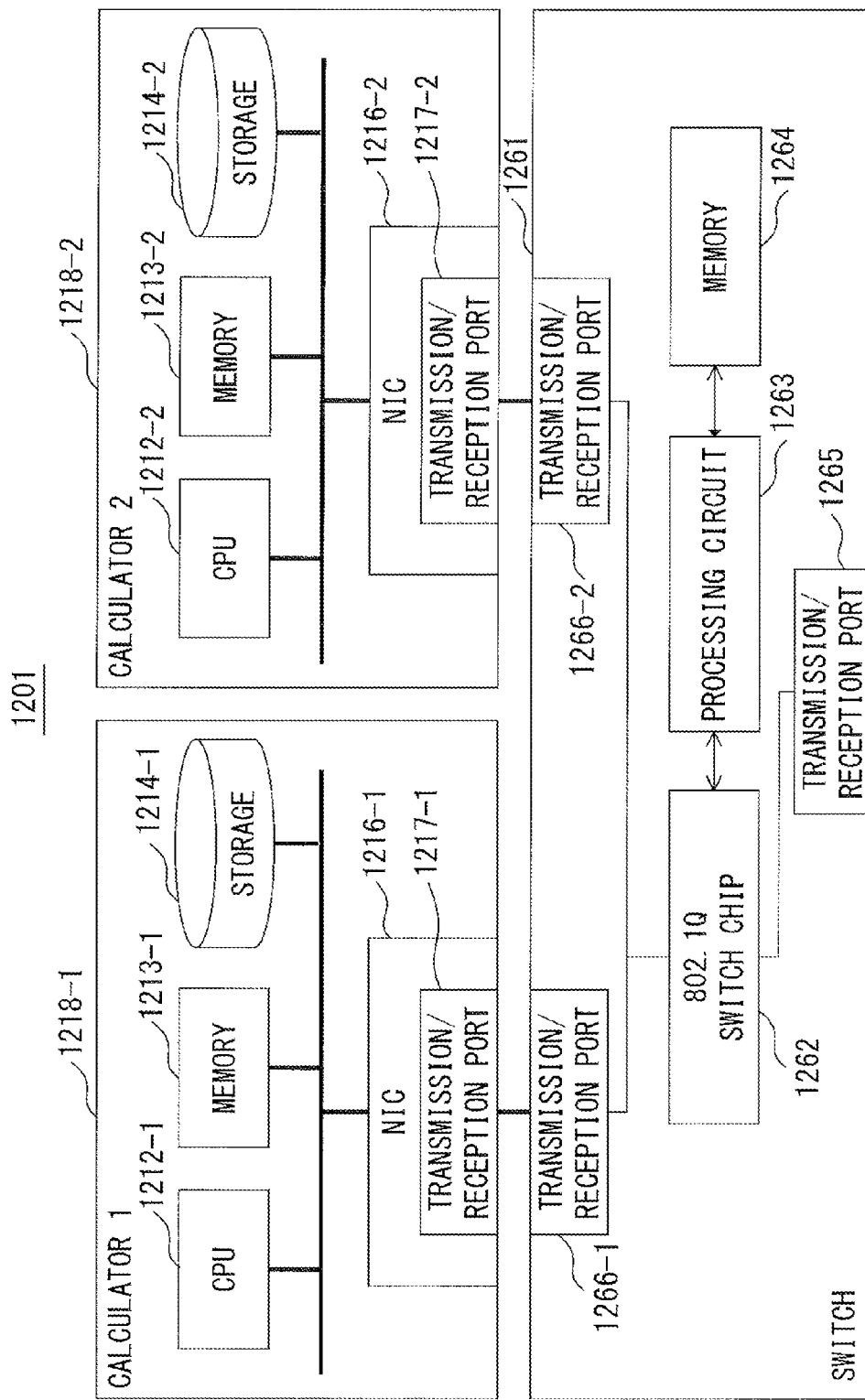
F I G. 21

INFORMATION PROCESSING SYSTEM, INFORMATION PROCESSING APPARATUS AND CONTROL METHOD OF INFORMATION PROCESSING SYSTEM

CROSS-REFERENCE TO RELATED APPLICATION

This application is based upon and claims the benefit of priority of the prior Japanese Patent Application No. 2015-010144, filed on Jan. 22, 2015, the entire contents of which are incorporated herein by reference.

FIELD

The embodiments discussed herein are related to an information processing system, an information processing apparatus and a control method of an information processing system.

BACKGROUND

In recent years, regarding datacenter networks, network virtualization technology utilizing overlay technology such as VXLAN (Virtual eXtensible Local Area Network), STT (Stateless Transport Tunneling), etc. has been gathering attention.

According to VXLAN, which is an overlay technique, a VTEP (VXLAN Terminal End Point) is arranged at an end point of an edge of a VXLAN. A VTEP performs a packet conversion process such as encapsulation of a packet to be transmitted to a VXLAN, decapsulation of a packet received from a VXLAN, etc.

A VTEP operates in accordance with a hypervisor in a physical server. In other words, the packet conversion process is performed by means of software.

In the network virtualization, the encapsulation of packets is performed by means of software, and this has caused performance problems for reasons that a bottleneck occurs due to loads on the CPU (Central Processing Unit) and it is difficult to benefit from the speed acceleration function of an NIC (Network Interface Card), etc.

In the above situation, products that realize higher speeds by conducting off-load of encapsulation/decapsulation processes of packets conducted by software into hardware such as a NIC, a switch, etc. (hardware off-load) are emerging. In other words, these products realize the function of a VTEP by using a NIC or a switch.

At a protocol termination point for network virtualization such as a VTEP, destination node information of packets after encapsulation is obtained from a destination table so as to conduct encapsulation by using the obtained information.

The number of entries in a destination table of a device having an off-load function is very small because of the implementation area and cost. Accordingly, it is difficult to realize a large-scale configuration while using an off-load function.

Furthermore, a document such as Japanese Laid-open Patent Publication No. 2014-160907 is well known.

SUMMARY

According to an aspect of the invention, an information processing system includes a plurality of information processing apparatuses.

A first information processing apparatus among the plurality of information processing apparatuses includes a first memory and a first processing circuit.

The first memory is configured to store a first destination information table in which destination information and specific destination information that corresponds to the destination information are associated.

The first processing circuit is configured to calculate a hash value on the basis of destination information included in a first packet received from a virtual machine, to search the first destination information table, to select a second information processing apparatus on the basis of the calculated hash value when a search target entry does not exist, and to generate a second packet that is a result of the hash value added and specifying information to specify the first information processing apparatus, which is the apparatus of the first processing circuit, to the received first packet.

The first processing circuit is configured to transmit the second packet to the second information processing apparatus.

A second information processing apparatus among the plurality of information processing apparatuses includes a second memory and a second processing circuit.

The second memory is configured to store a second destination information table in which destination information and specific destination information that corresponds to the destination information are associated.

The second processing circuit is configured to receive the second packet.

The second processing circuit is configured to transmit to a destination represented by the specific destination information a third packet that is a result of the second converted packet by using a specific destination information obtained by searching the second destination information table on the basis of the hash value included in the second packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a configuration diagram of an information processing system according to an embodiment;

FIG. 5 is an example of a node determination table;

FIG. 6 illustrates an example of a VNI table;

FIG. 7 illustrates an example of a destination VTEP table (first);

FIG. 8 illustrates an example of a destination VTEP table (second);

FIG. 9 illustrates a VXLAN packet format in detail;

FIG. 21 is a hardware diagram of a node according to another embodiment.

DESCRIPTION OF EMBODIMENTS

Figure 2:
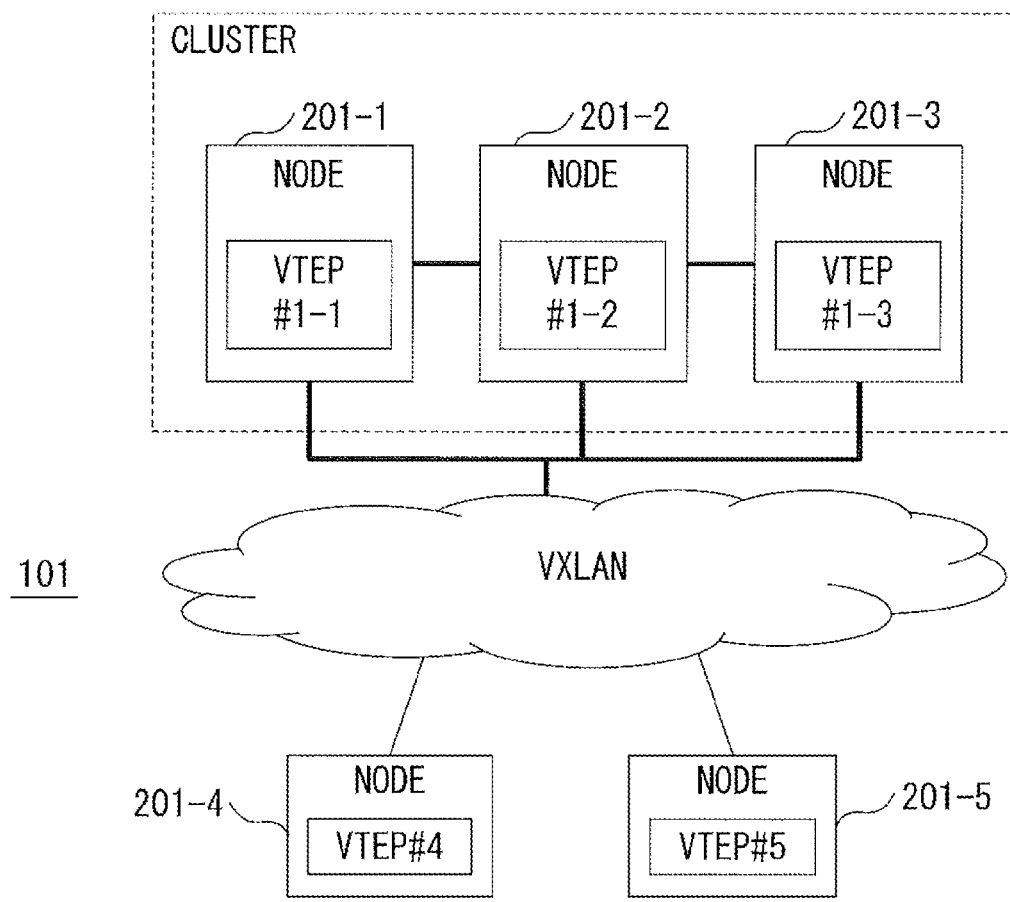
FIG. 2 illustrates a variation example of a system configuration of the information processing system according to an embodiment.

Hereinafter, explanations will be given for the embodiments by referring to the drawings.

FIG. 1 is a configuration diagram of an information processing system according to an embodiment.

An information processing system 101 includes nodes 201-*i* (i=1 through 5).

The nodes 201 are for example a server, a personal computer, etc. The node 201 is an example of an information processing apparatus.

The node 201-*i* is connected to a VXLAN. The VXLAN is an example of an overlay network. The nodes 201-1 through 201-3 are connected to the nodes 201-4 and 201-5 via the VXLAN.

The nodes 201-1 through 201-5 are respectively provided with the functions of VTEP #1-1 through #1-3, #4 and #5. A VTEP is arranged at an end point of an edge of a VXLAN, and performs a packet conversion process such as encapsulation of a packet to be transmitted to the VXLAN, decapsulation (cancellation of encapsulation) of a packet received from the VXLAN, etc.

The nodes 201-1 through 201-3 are connected to each other via dedicated communication channels. In the information processing system 101, the nodes 201-1 through 201-3 constitute a cluster (group).

Each of VTEPs #1-1 through #1-3, #4 and #5 has a destination VTEP table. A destination VTEP table stores destination information of a packet (destination MAC address) and specific destination information of a VTEP (VTEP IP address and VTEP MAC address) in an associated manner.

VTEPs #1-1 through #1-3, #4 and #5 perform encapsulation of packets by using a destination VTEP table.

Destination VTEP tables are created so that duplication does not occur between entries in destination VTEP tables in a cluster. For example, among nodes 201-1 through 201-3 in a cluster, information of VTEP #5 is described in the destination VTEP table included in the node 201-1 and information of VTEP #4 is described in the destination VTEP table included in the node 201-2.

Also, the information processing system 101 according to an embodiment may employ a configuration as illustrated in FIG. 2.

In the information processing system illustrated in FIG. 1, the nodes 201-1 through 201-3 are connected to each other via dedicated communication channels respectively, whereas it is also possible to make it possible for the nodes 201-1 through 201-3 to communicate with each other via a physical communication channel that is shared with the VXLAN as illustrated in FIG. 2.

It is also possible to configure logical communication channels that are independent (isolated) from each other in a shared physical communication channel so as to connect the nodes 201-1 through 201-3 to each other.

Figure 3:
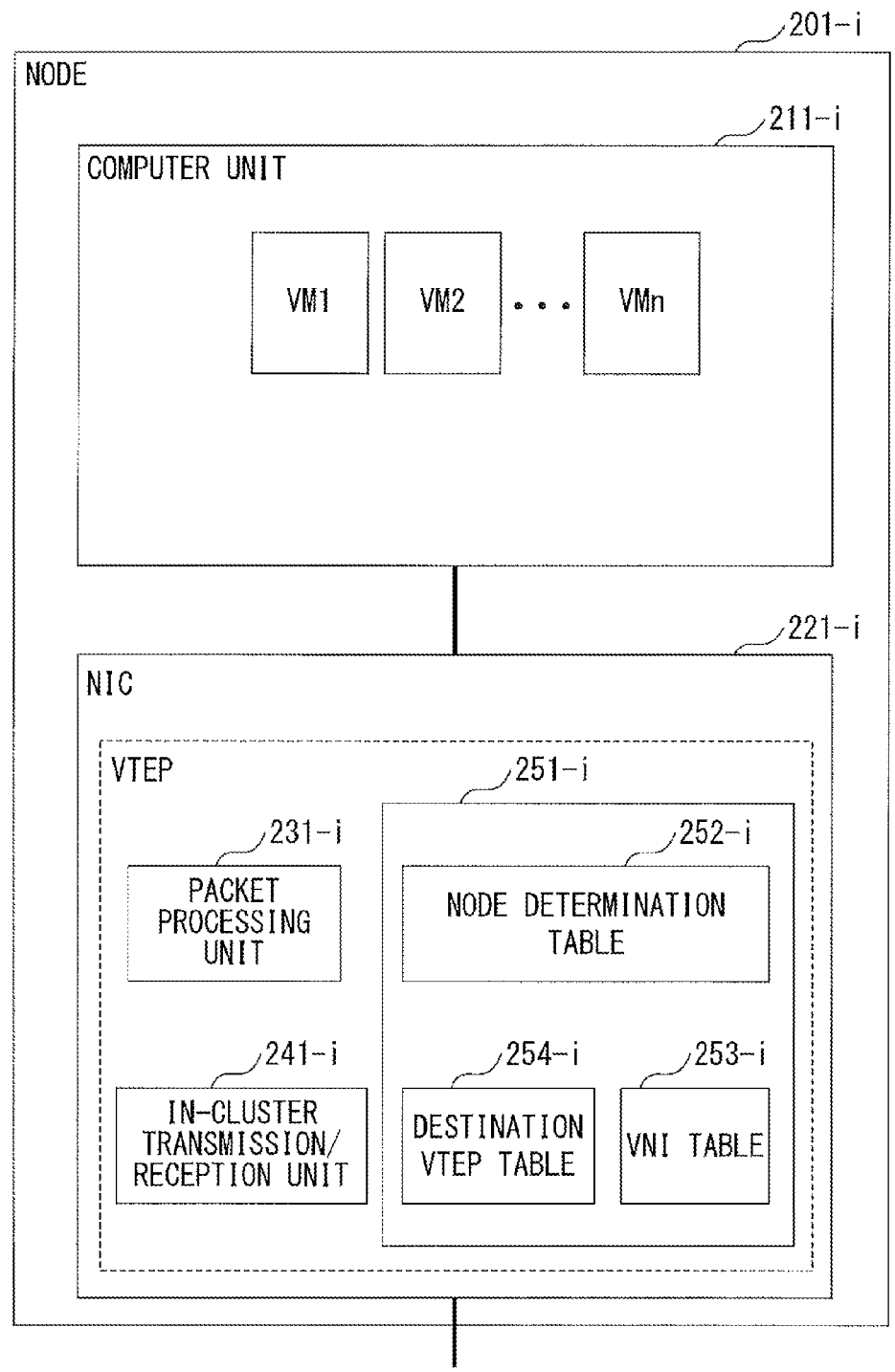
FIG. 3 is a configuration diagram of a node according to an embodiment.

FIG. 3 is a configuration diagram of a node according to an embodiment.

The node 201-*i* includes a computer unit 211-*i* and an NIC 221-*i*.

The computer unit 211-*i* is a hardware device that can execute a program. In the computer unit 211-*i*, a virtual machine (VM) is executed. Note that the number of virtual machines may be arbitrary.

The NIC 221-*i* conducts input and output (I/O) with a network such as a VXLAN etc.

The NIC 221-*i* includes a packet processing unit 231-*i*, an in-cluster transmission/reception unit 241-*i* and a storage unit 251-*i*. The packet processing unit 231-*i*, the in-cluster transmission/reception unit 241-*i* and the storage unit 251-*i* realize the function of a VTEP.

The packet processing unit 231-*i* performs processes such as searching for a destination VTEP table for a received packet, calculation of a hash value, encapsulation/decapsulation of a packet, etc.

The in-cluster transmission/reception unit 241-*i* performs processes of determination of the node 201-*i* in a cluster to which to transfer a packet, addition of information to a packet, transfer of a packet to the determined node 201-*i*, etc.

The storage unit 251-*i* is a storage device for storing data and a table used in the NIC 221-*i*. The storage unit 251-*i* stores a node determination table 252-*i*, a VNI table 253-*i* and a destination VTEP table 254-*i*. The node determination table 252-*i*, the VNI table 253-*i* and the destination VTEP table 254-*i* will be explained later in detail.

Figure 4:
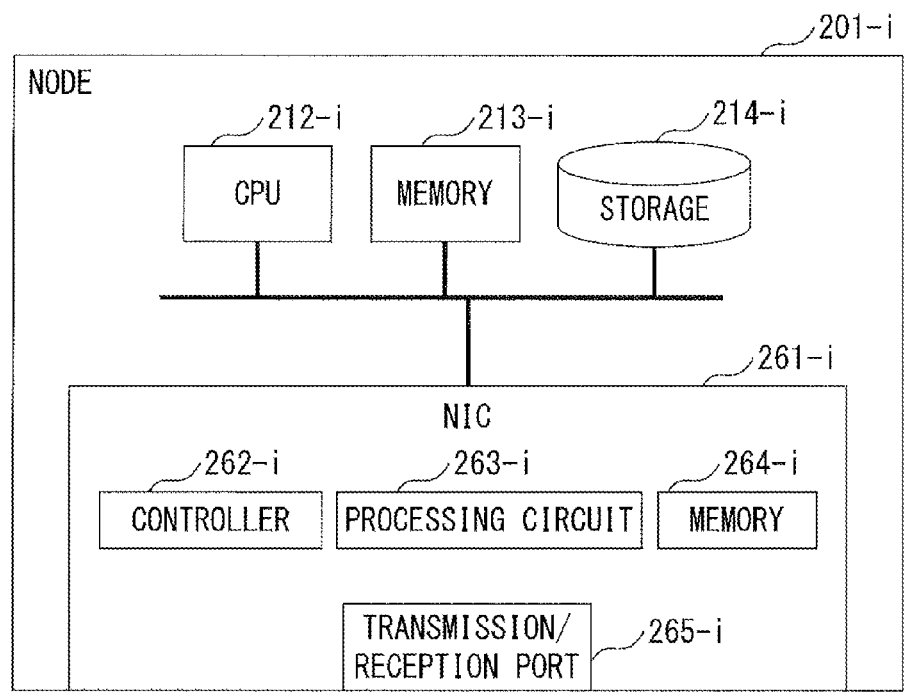
FIG. 4 is a hardware diagram of a node according to an embodiment.

FIG. 4 is a hardware diagram of a node according to an embodiment.

The node 201-*i* includes a CPU 212-*i*, a memory 213-*i*, a storage 214-*i* and an NIC 261-*i*.

The CPU 212-*i*, the memory 213-*i* and the storage 214-*i* correspond to the computer unit 211-*i*.

The CPU 212-*i* is a processor that performs various processes. The CPU 212-*i* executes a program read onto the 213-*i*, and thereby performs various processes such as the control of a virtual machine.

The memory 213-*i* is a storage device that temporarily stores data, a program, etc. used by the node 201-*i*. An example of the memory 213-*i* is a RAM (Random Access Memory).

The storage 214-*i* is a storage device that stores data, program, etc. used by the node 201-*i*. Examples of the storage 214-*i* are a magnetic disk device (hard disk drive), a non-volatile memory, etc.

The NIC 261-*i* includes a controller 262-*i*, a processing circuit 263-*i*, a memory 264-*i* and a transmission/reception port 265-*i*.

The NIC 261-*i* corresponds to the NIC 221-*i*.

The controller 262-*i* is a chip for controlling the NIC 261-*i*.

The processing circuit 263-*i* conducts calculation of a hash value, encapsulation/decapsulation of a packet, determination of the node 201-*i* to which to transfer a packet, addition of information to a packet and transfer of a packet to the determined node 201-*i*. The processing circuit 263-*i* corresponds to the packet processing unit 231-*i* and the in-cluster transmission/reception unit 241-$i$. Also, the processing circuit 263-$i$ may be a processor that executes a program stored in the memory 264-$i$.

The 264-$i$ is a storage device that temporarily stores data, a program, etc. used by the NIC 261-$i$. The memory 264-$i$ corresponds to the storage unit 251-$i$.

The transmission/reception port 265-$i$ is an interface for conducting transmission and reception of a packet.

Figure 5:
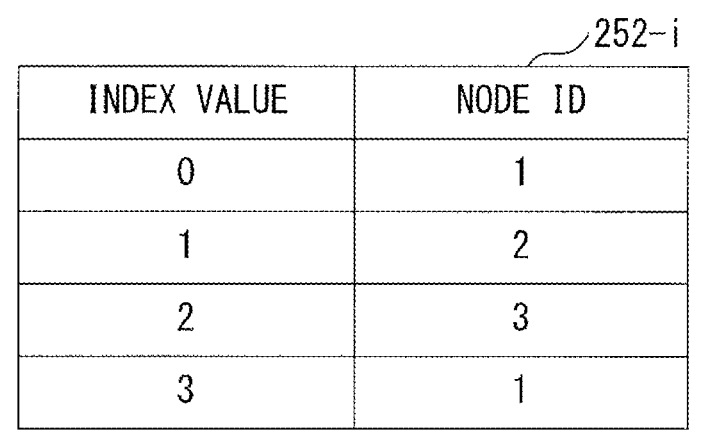

FIG. 5 is an example of a node determination table.

The node determination table 252-$i$ is used in a process of determining a responsible node, which will be described later, and represents which node 201-$i$ has information of the destination VTEP of a transmission packet.

A node determination table describes an index value and a node ID in an associated manner.

An index value is an index referred to when search is conducted, and describes part of a hash value calculated from a transmission packet.

A node ID is an identifier for identifying the node 201-$i$. A unique node ID has been assigned to the node 201-$i$.

FIG. 6 illustrates an example of a VNI table.

The VNI table 253-$i$ describes a correspondence relationship between a VM and a logical network to which the VM belongs.

The VNI table 253-$i$ described an address, a transmission source MAC address, a VLAN ID and a VNI in an associated manner.

An address is an index for identifying an entry of a VNI table.

A transmission source MAC address is a MAC address of a VM.

A VLAN ID is identification information of a VLAN to which a VM belongs.

A VNI is identification information of a logical network to which a VM belongs.

FIG. 7 illustrates an example of a destination VTEP table (first).

The destination VTEP table 254-$i$-1 describes an address, a destination MAC address, a VNI, a destination VTEP IP address and a destination VTEP MAC address in an associated manner.

An address is an index for identifying an entry of the destination VTEP table 254-$i$-1.

An destination MAC address is the MAC address of a VM of a destination. A destination MAC address is an example of a destination information.

A VNI is identification information of a logical network.

A destination VTEP IP address is the IP address of a VTEP.

A destination VTEP MAC address is a VTEP MAC address.

A destination VTEP IP address and a destination VTEP MAC address are examples of specific destination information.

Also, the destination VTEP table 254-$i$ may employ the following configuration.

FIG. 8 illustrates an example of a destination VTEP table (second).

In this example (second), two tables, specifically tables 254-$i$-2 and 254-$i$-3 constitute the destination VTEP table 254-$i$.

In this example, the destination VTEP table illustrated in FIG. 7 is divided into the two tables 254-$i$-2 and 254-$i$-3. Thereafter, entries of the two tables 254-$i$-2 and 254-$i$-3 are associated by using the destination VTEP ID of each table as a key.

The first table 254-$i$-2 describes an address, a destination MAC address, a VNI and a destination VTEP ID in an associated manner.

An address, a destination MAC address and a VNI are similar to those in the example of the destination VTEP table (first), and explanations thereof will be omitted.

A destination VTEP ID is the identification information of a VTEP.

The second table 254-$i$-3 describes a destination VTEP ID, a destination VTEP IP address and a destination VTEP MAC address in an associated manner.

A destination VTEP ID is the identification information of a VTEP.

A destination VTEP IP address and a destination VTEP MAC address are similar to those in the example of the destination VTEP table (first), and the explanations thereof will be omitted.

When a search is conducted by using two tables as described above, the first table 254-$i$-2 is first searched and the second table 254-$i$-3 is referred to by using, as a key, the detected destination VTEP ID. Then, the destination VTEP IP address and the destination VTEP MAC address corresponding to the detected destination VTEP ID are obtained as search results.

Entries in the destination VTEP table 254-$i$ are set so that duplication does not occur between the nodes 201-1 through 201-3 in the cluster.

FIG. 9 illustrates the VXLAN packet format in detail.

Figure 10:
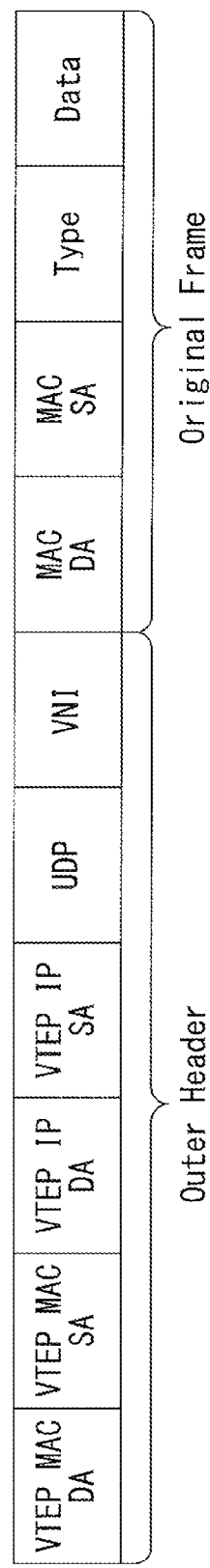
FIG. 10 is a schematic diagram of a format of a VXLAN packet.

FIG. 10 is a schematic diagram of a format of a VXLAN packet. The VXLAN packet illustrated in FIG. 10 is part of the VXLAN packet illustrated in FIG. 9.

A VXLAN packet is a packet obtained as a result of encapsulation of an original Ethernet frame (original frame). For the encapsulation, an outer header has been added to the original Ethernet frame. An outer header includes an outer Ethernet header, an outer IP header, an outer UDP (User Datagram Protocol) header, and a VXLAN header.

An outer Ethernet header includes a destination MAC address field (the field in which "Destination VTEP MAC Address (H)" and "Destination VTEP MAC Address (L)" are described in FIG. 9), a transmission source MAC address field (the field in which "Source VTEP MAC Address (H)" and "Source VTEP MAC Address (L)" are described in FIG. 9), an EtherType field, and an Outer VLAN Tag Information field.

Among the above fields, the EtherType field is afield in which an identifier representing the type of a communication protocol is stored as data. "C-Tag 802.1Q" described in the Optional EtherType field indicates that IEEE (Institute of Electrical and Electronic Engineers) 802.1Q has been specified as the network standard. In such a case, in the Outer VLAN Tag Information field, a PCP (Priority Code Point), a CFI (Canonical Format Indicator) and VLAN ID (Identifier) are stored as data. PCP is data specifying the priority of a VXLAN packet. CFI is data representing whether or not a MAC address is an official format.

An outer IP header includes a ToS (Type of Service) field, a Protocol field, a transmission source IP address field (in which "Source VTEP IP Address" is described in FIG. 9) and a destination IP address field (in which "Destination VTEP IP Address" is described in FIG. 9). In the ToS field, type data, which represents the type of the service, is stored, In the Protocol field, an identifier representing the type of the communication protocol is stored.

An outer UDP header includes a transmission port number field (in which "Source Port" is described in FIG. 9) and a reception port number field (in which "Dest Port" is described in FIG. 9). As a general rule, a transmission port number field stores information for identifying a transmission source application software in the same transmission source IP address and the reception port number field stores information for identifying a transmission destination application software in the same destination IP address. "Dest Port=VXLAN Port" in FIG. 9 indicates that this UDP packet is a VXLAN packet. In a VXLAN, it is possible to set an arbitrary value as a transmission source port number, and "Source Port=xxxx" in FIG. 9 indicates that an arbitrary number has been set. Note that the VXLAN specification recommends that information related to original packet information before encapsulation (such as a hash value etc.) be stored.

A VXLAN header includes a flag field (in which "Flags" is described in FIG. 9), a VXLAN Network Identifier field for storing a VNI (VXLAN Network Identifier) and a reserved bit (in which "Reserved" is described in FIG. 9).

Figure 11:
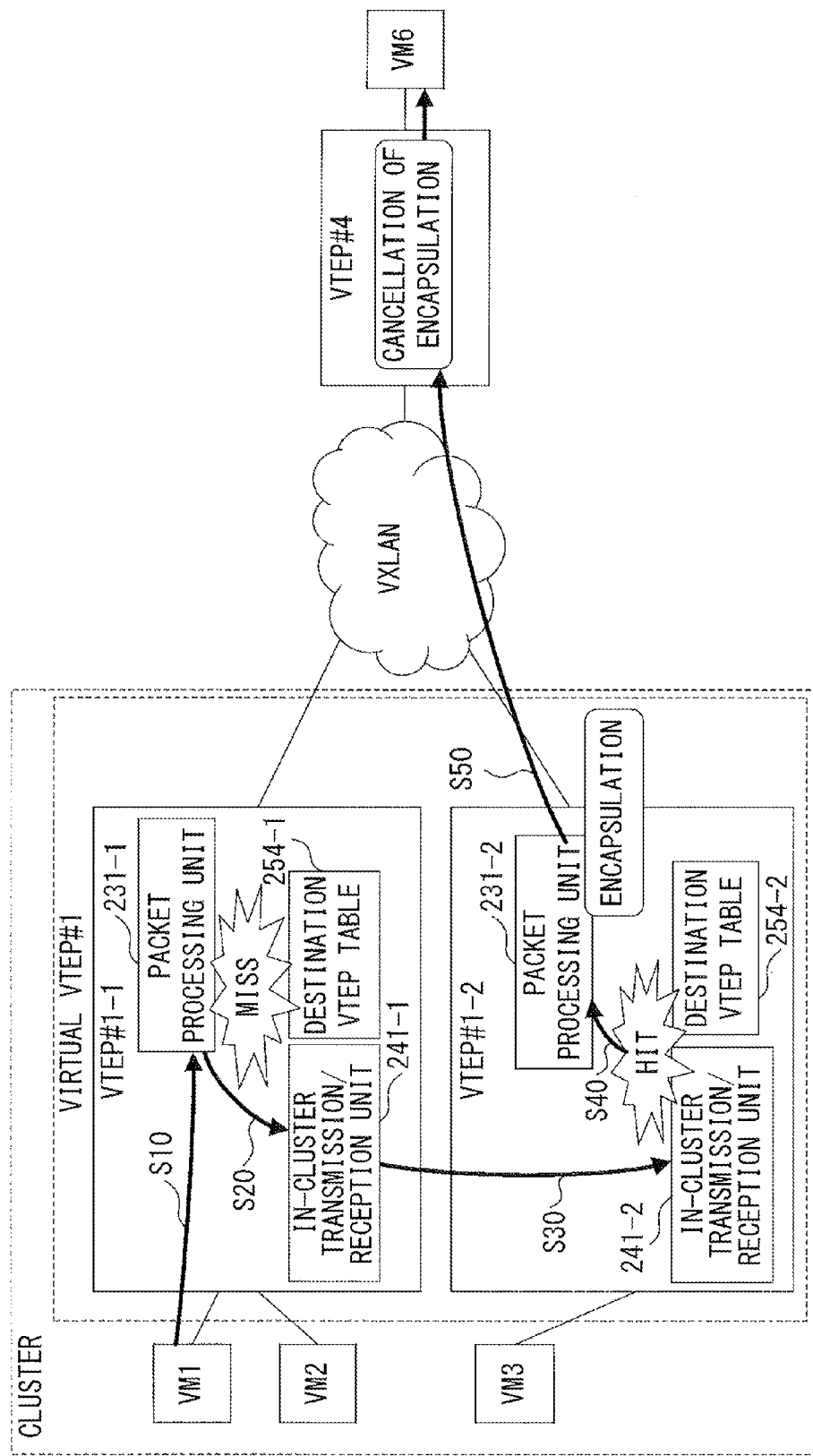
FIG. 11 schematically illustrates a packet relay method according to an embodiment.

FIG. 11 schematically illustrates a packet relay method according to an embodiment.

In FIG. 11, explanations will be given for a case where VM1 operating in the node 201-1 transmits a packet to VM6 operating in the node 201-4. Note that in FIG. 11, VTEPs #1-3 and #5 are omitted.

In the embodiment, the nodes 201-1 through 201-3 constitute a cluster and VTEPs #1-1 through #1-3 of the nodes 201-1 through 201-3 cooperate so as to operate as one virtual VTEP #1. Information used for packet conversion is described in the destination VTEP tables 254-1 and 254-2 so that duplication does not occur between the nodes 201-1 through 201-3 in the cluster.

First, VM1 outputs a packet destined to VM6 to VTEP #1-1 (step S10).

The packet processing unit 231-1 of VTEP #1-1 receives the packet, calculates a hash value, searches the destination VTEP table 254-1, and transfers the hash value calculated for the search and the received packet to the in-cluster transmission/reception unit 241-1 when information corresponding to the received packet has not been registered in the table as the search result (step S20).

The in-cluster transmission/reception unit 241-1 determines the node 201-2 (VTEP #1-2) that is responsible for the received packet on the basis of (part of) the hash value, and adds the information of the device to which the in-cluster transmission/reception unit 241-1 belongs to the received packet and transfers it to the determined node 201-2 (VTEP #1-2) (step S30).

When the in-cluster transmission/reception unit 241-2 has received a packet including a hash value, the packet processing unit 231-2 searches the destination VTEP table 254-2 by using the hash value (for this, it is unnecessary to calculate the hash value again), and obtains the specific destination information (destination VTEP IP address and destination VTEP MAC address) corresponding to the packet described in the obtained entry (step S40).

The packet processing unit 231-2 converts (encapsulates) the packet by using the obtained specific destination information and transmits it to the network (step S50).

Figure 12:
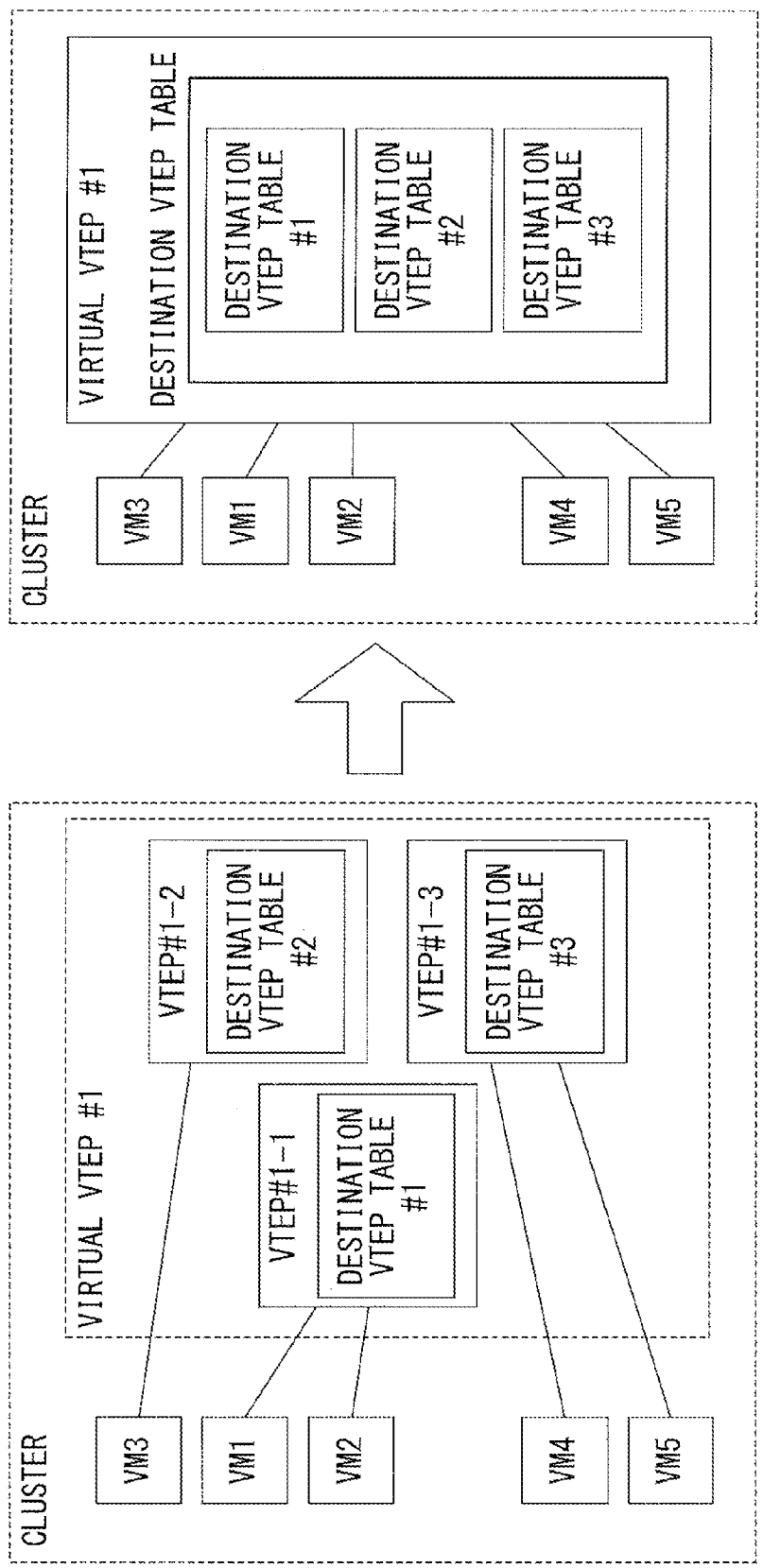
FIG. 12 illustrates apparent operations of a cluster of an embodiment.

FIG. 12 illustrates apparent operations of the cluster of the embodiment.

In the information processing system 101, the plurality of nodes 201-1 through 201-3 (VTEP #1-1 through #1-3) operate in cooperation (the left diagram in FIG. 12). Seen from VM1 through VM5, which are operating in the nodes of the cluster, the VTEP to which they themselves are connected look like a virtual VTEP having one large destination VTEP table (right diagram in FIG. 12). When for example the number of entries are the same between the tables of the respective nodes, the number of entries of the tables becomes N times when N nodes constitute a cluster.

Figure 13:
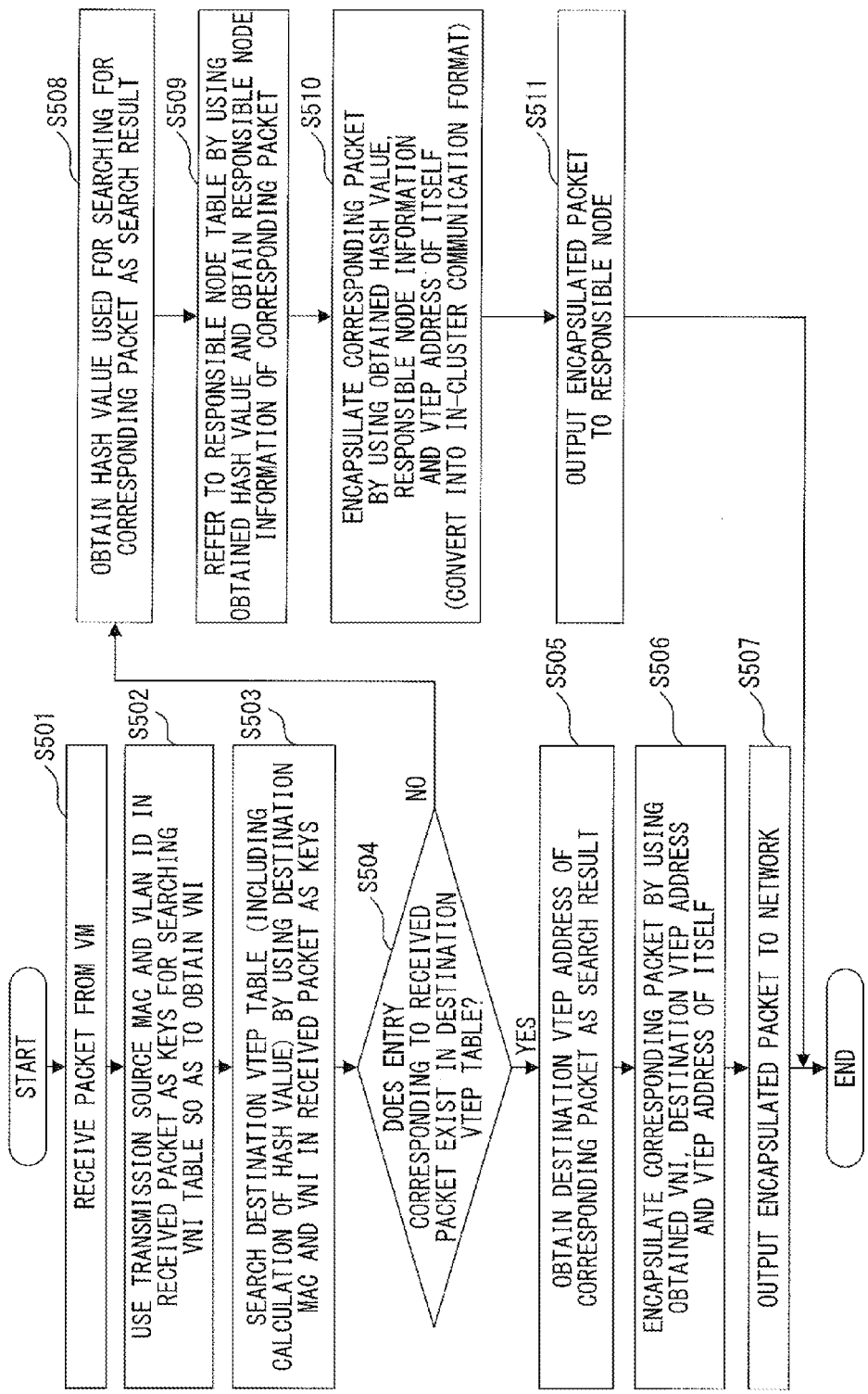
FIG. 13 is a flowchart for a packet relay method according to an embodiment.

FIG. 13 is a flowchart for a packet relay method according to an embodiment.

FIG. 13 illustrates a process of a VTEP that first receives a packet output from a virtual machine (VM). For example, in the example illustrated in FIG. 11, the process corresponds to the process of VTEP #1-1 (node 201-1) that first receives a packet from VM1.

In step S501, the packet processing unit 231-i receives a packet from a VM. Hereinafter, packets that were received are referred to as received packets.

In step S502, the packet processing unit 231-i searches the VNI table 253-i by using, as keys, the transmission source MAC address and the VLAN ID included in the received packet. The packet processing unit 231-i obtains the VNI corresponding to the key as a result of the search.

In step S503, the packet processing unit 231-i uses the destination MAC address included in the received packet and the obtained VNI so as to calculate the hash value, and searches the destination VTEP table 254-i by using the hash value. More specifically, the packet processing unit 231-i refers to the entry of the address of the destination VTEP table 254-i that corresponds to the hash value.

In step S504, the packet processing unit 231-i checks whether or not an entry corresponding to the received packet exists in the destination VTEP table 254-i, and the control proceeds to step S505 when it exists, and the control proceeds to step S508 when it does not. More specifically, the packet processing unit 231-i checks whether or not the entry of the destination VTEP table 254-i referred to by using the hash value is identical to the destination MAC address included in the received packet and the obtained VNI. When it is identical, the packet processing unit 231-i determines that an entry corresponding to the received packet exists in the destination VTEP table 254-i. When it is not identical, the packet processing unit 231-i determines that an entry corresponding to the received packet does not exist in the destination VTEP table 254-i.

In step S505, the packet processing unit 231-i obtains the destination VTEP address of the received packet (destination VTEP IP address and destination VTEP MAC address) as a search result.

In step S506, the packet processing unit 231-i uses the obtained VNI, the destination VTEP address and the VTEP address of itself so as to encapsulate the receive packet (packet conversion).

In step S507, the packet processing unit 231-i outputs the encapsulated packet to the destination VTEP.

In step S508, the in-cluster transmission/reception unit 241-i obtains the hash value used for the search as a search result.

In step S509, the in-cluster transmission/reception unit 241-i uses the obtained hash value so as to refer to the node determination table 252-i, and obtains the node ID corresponding to the hash value (responsible node information). In other words, the packet processing unit 231-i determines a responsible node for the received packet and obtains responsible node information, which is information of the responsible node.

In step S510, the in-cluster transmission/reception unit 241-i uses the obtained hash value, the responsible node information and the VTEP address of itself so as to encapsulate the received packet (packet conversion). In more detail, in a case of a VXLAN, the in-cluster transmission/ reception unit 241-*i* converts the received packet into a VXLAN packet for transfer between in-cluster nodes, which will be described later.

In step S511, the packet processing unit 231-*i* transmits the encapsulated packet to the responsible node.

Here, an example of a process of determining a responsible node will be described.

Figure 14:
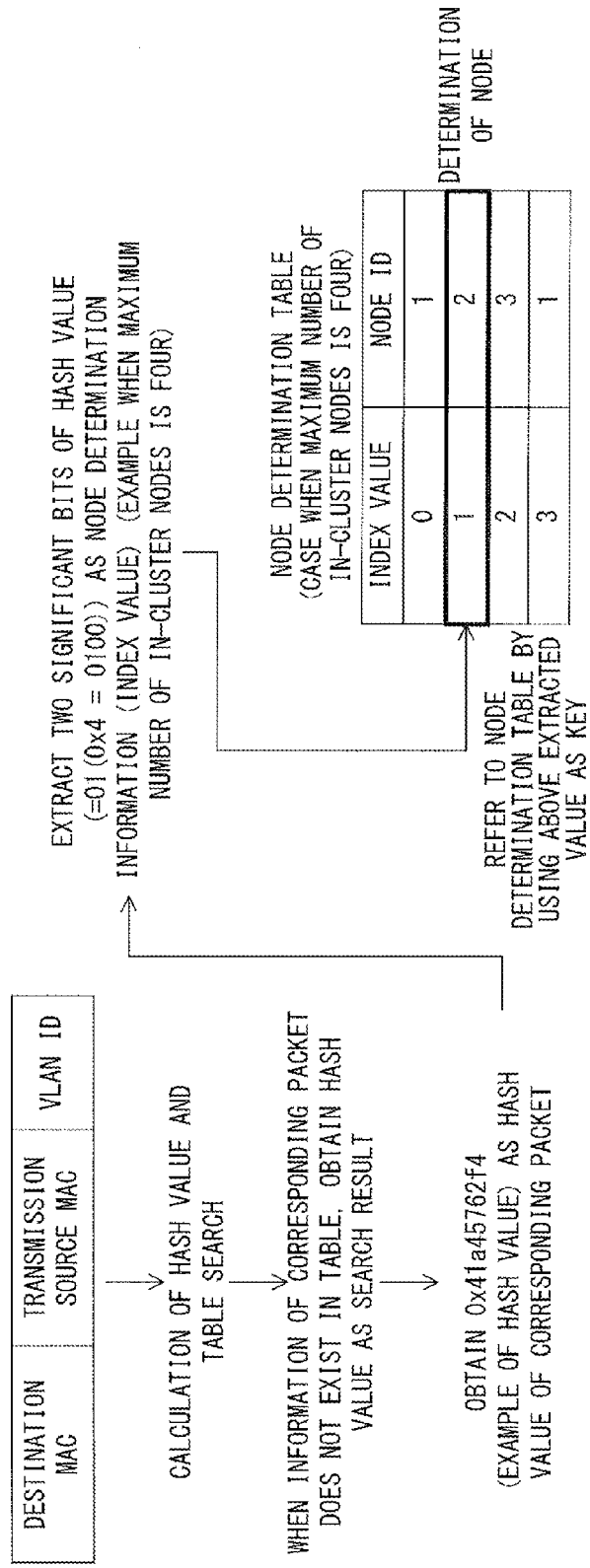
FIG. 14 illustrates a process of determining a responsible node.

FIG. 14 illustrates a process of determining a responsible node.

As explained by referring to FIG. 13, the packet processing unit 231-*i* receives a packet from a VM (step S501), searches the VNI table 253-*i* by using the transmission source MAC address and the VLAN ID of the received packet, and obtains a VNI (step S502). Then, the packet processing unit 231-*i* uses the destination MAC address of the received packet and the obtained VNI so as to calculate the hash value, and searches the destination VTEP table 254-*i* (step S503).

When an entry corresponding to the received packet does not exist in the destination VTEP table 254-*i* (No in step S504), the in-cluster transmission/reception unit 241-*i* obtains the hash value as a search result (step S508). In this example, it is assumed that 0x41a45762f4 was obtained as the hash value of the received packet.

As node determination information (index value), the in-cluster transmission/reception unit 241-*i* extracts the two significant bits of the obtained hash value (=01(0x4=0100)). In this example, it is assumed that the maximum number of nodes in the cluster is four.

Then, the in-cluster transmission/reception unit 241-*i* refers to the node determination table 252-*i* by using the extracted node determination information as a key (S509). In FIG. 14, "2" is obtained as a node ID that corresponds to index value=01. Accordingly, node 201-*i* that corresponds to node ID=2 is determined (calculated) as a responsible node.

In order to make it possible to determine a responsible node by the above process, which entry is to be arranged in which of the nodes 201-*i* at the generation of the destination VTEP table 254-*i* is determined by calculating a hash value from the destination MAC address and the VNI and referring to the node determination table 252-*i* by using (part of) the hash value similarly to the process of determining a responsible node. Note that the above method of obtaining an index value from a hash value is an example and the invention is not limited to the method described herein.

Figure 15:
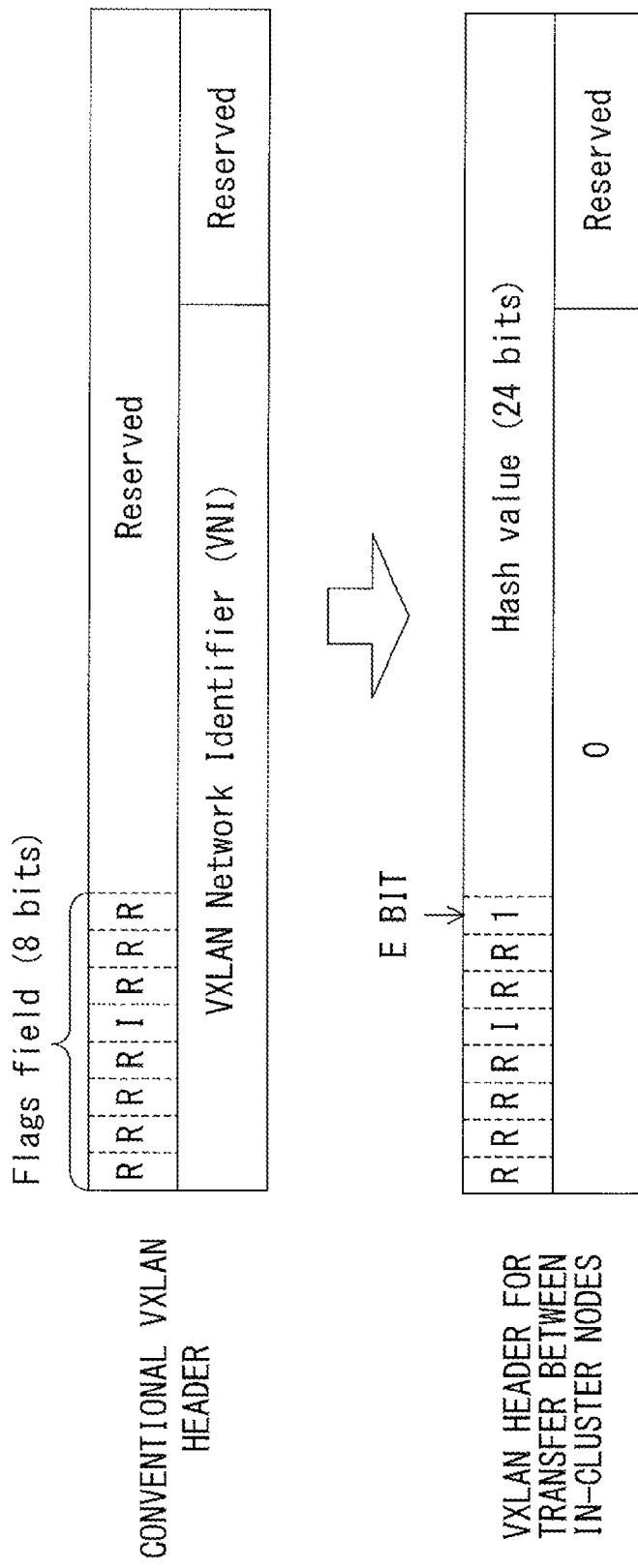
FIG. 15 illustrates a VXLAN header for transfer of a packet between in-cluster nodes.

FIG. 15 illustrates a VXLAN header for transfer of a packet between in-cluster nodes.

The upper table of FIG. 15 illustrates a conventional or standard VXLAN header, and the lower table illustrates a VXLAN header of a packet for transfer between in-cluster nodes.

Seven bits in the flag field, which has eight bits, of a conventional VXLAN header are reserved bits (denoted by "R" in FIG. 15). In an embodiment, the least significant bit in the flag field is used as a bit for indicating whether or not the packet is a normal VXLAN packet or a packet of communications between in-cluster nodes.

In an embodiment, the least significant bit in the flag field is referred to as an E bit. An E bit is used as control information for indicating whether the packet is a normal VXLAN packet or a packet of communications between in-cluster nodes. A case when E bit=0 is satisfied represents a case when the packet is a normal VXLAN packet and a case when E bit=1 is satisfied represents a case when the packet is a packet of communications between in-cluster nodes.

As illustrated in the lower table in FIG. 15, when a packet is to be transferred to a node in a cluster, the E bit is set to one. Also, the reserved bit of the VXLAN header is set to the hash value of the packet and the VNI field is set to zero.

Figure 16:
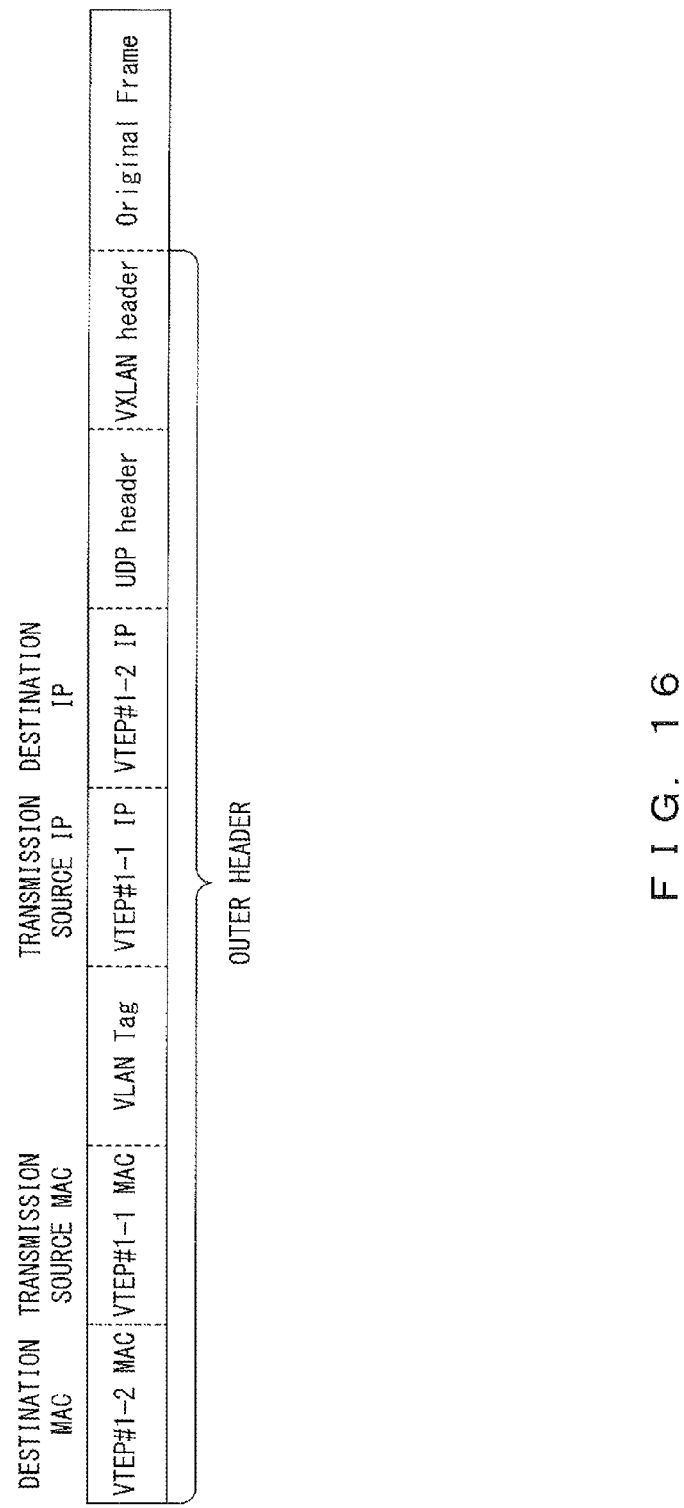
FIG. 16 illustrates a VXLAN packet for transfer of a packet between in-cluster nodes.

FIG. 16 illustrates a VXLAN packet for a case when a packet is transferred between in-cluster nodes.

In FIG. 16, similarly to FIG. 11, VTEP #1-1 receives a packet from VM1 and transfers the packet to VTEP #1-2. FIG. 16 illustrates a VXLAN packet transmitted from VTEP #1-1 to VTEP #1-2.

In the destination MAC address and the destination IP address of a VXLAN packet, the MAC address and the IP address of VTEP #1-2 are described, respectively. In the transmission source MAC address and the transmission source IP address of a VXLAN packet, the destination MAC address and the destination IP address of VTEP #1-1 are described, respectively. Also, in the VXLAN header, the VXLAN header for transfer between in-cluster nodes illustrated in FIG. 15 is set.

In the above explanations, packet conversion for transfer between in-cluster nodes in a case when a VXLAN is used as the overlay protocol has been described, and explanations will be given for a method of converting a packet when transfer is conducted between in-cluster nodes in a case when Geneve is used as the overlay protocol.

According to Geneve, it is possible to add a plurality of options to a tunnel header (corresponding to the VXLAN header of a VXLAN).

In packet conversion for transfer between in-cluster nodes in a case when Geneve is used as an overlay protocol, the processes as follows are conducted.

A hash value is embedded in a tunnel header as an option. Note that the option is set in the TLV (Type, Length, Value) format, and when a hash value is to be set, a value representing that it is TLV containing the hash value is set in Type, a length of the hash value is set in Length using the number of bytes (4 bytes in this example) set in Length, and the hash value is set in Value. The transmission source address and the destination address of the outer header are set similarly to the case of a VXLAN. Because a VNI has not been determined, zero is set in the VNI field.

Next, explanations will be given for a process of a node conducted when a packet has been received from another node in the same cluster or from a network.

Figure 17:
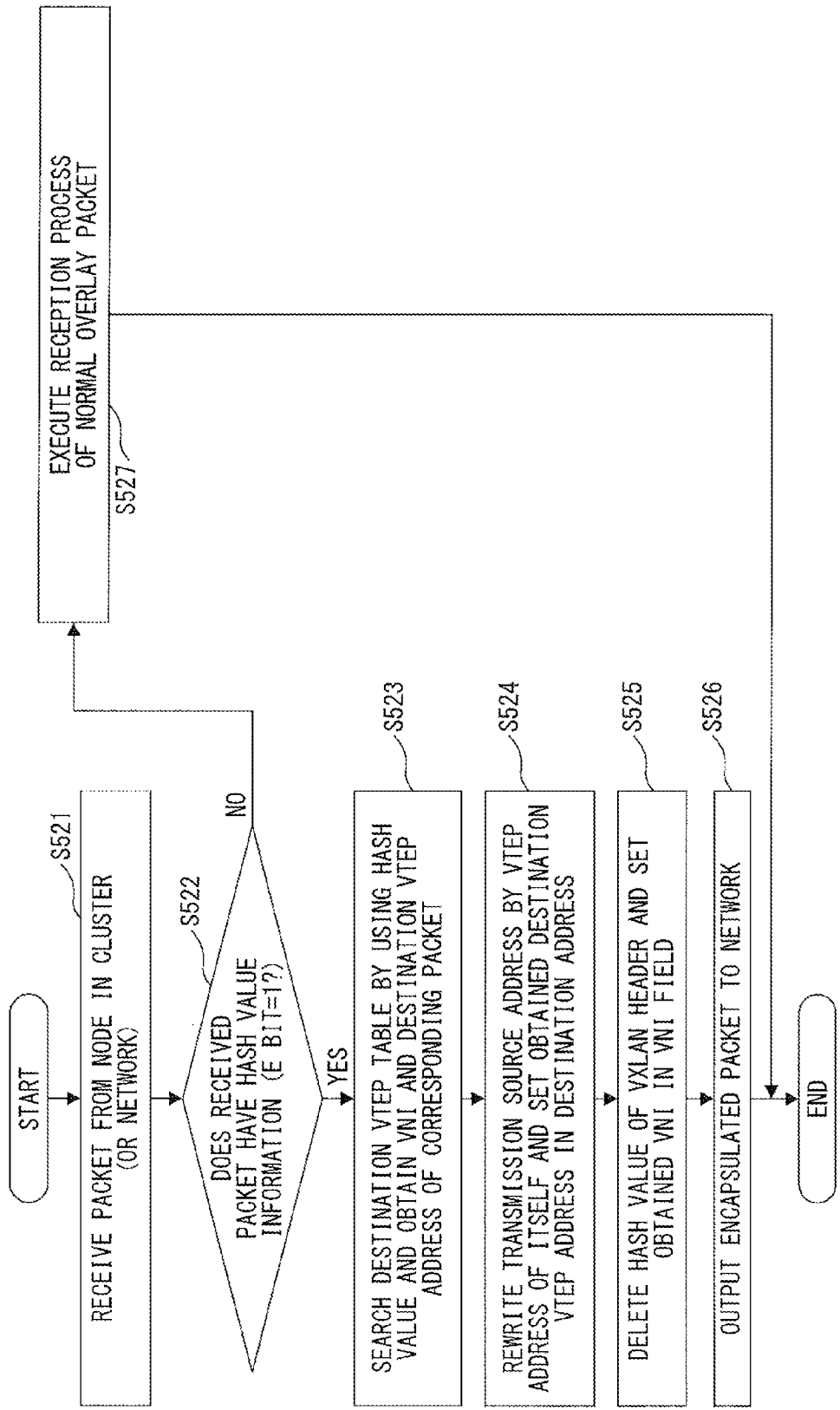
FIG. 17 is a flowchart of a packet relay method according to an embodiment.

FIG. 17 is a flowchart of a packet relay method according to an embodiment.

FIG. 17 illustrates a process of a VTEP that receives a packet transmitted from another VTEP in the same cluster or a packet from a VXLAN. For example, in the example illustrated in FIG. 11, it corresponds to the process of VTEP #1-2 (node 201-2) that receives a packet from VTEP #1-1.

In step S521, the in-cluster transmission/reception unit 241-*i* receives a packet from another node in the same cluster or a network (VXLAN).

In step S522, the packet processing unit 231-*i* determines whether or not the received packet includes a hash value. More specifically, in the case of a VXLAN, the packet processing unit 231-*i* refers to the E bit and determines whether or not a hash value exists on the basis of the VXLAN of the E bit. The packet processing unit 231-*i* determines that the received packet does not include a hash value when E bit=0, and determines that the received packet includes a hash value when E bit=1. When a hash value is included in the received packet, the control proceeds to step S523, and when a hash value is not included, the control proceeds to step S527.

In step S523, the packet processing unit 231-*i* searches the destination VTEP table 254-*i* by using the hash value, and obtains the VNI and the destination VTEP addresses (destination VTEP MAC address and the destination VTEP IP address) of the received packet. More specifically, the packet processing unit 231-*i* refers to an entry of the address of the VTEP table 254-*i* that corresponds to the hash value, and obtains the VNI and the destination VTEP addresses of the received packet.

In step S524, the packet processing unit 231-*i* rewrites the transmission source MAC address and the transmission source IP address of the outer header into the MAC address and the IP address of the VTEP itself, and sets the MAC address and the IP address of the obtained destination VTEP in the destination MAC address and the destination IP address of the outer header, respectively.

In step S525, the packet processing unit 231-*i* deletes the hash value included in the VXLAN header, and sets the obtained VNI in the VNI field.

In step S526, the packet processing unit 231-*i* outputs an encapsulated packet to the network.

In step S527, the packet processing unit 231-*i* executes a reception process of a normal overlay packet (for example, decapsulation (cancellation of encapsulation) etc.).

Figure 18:
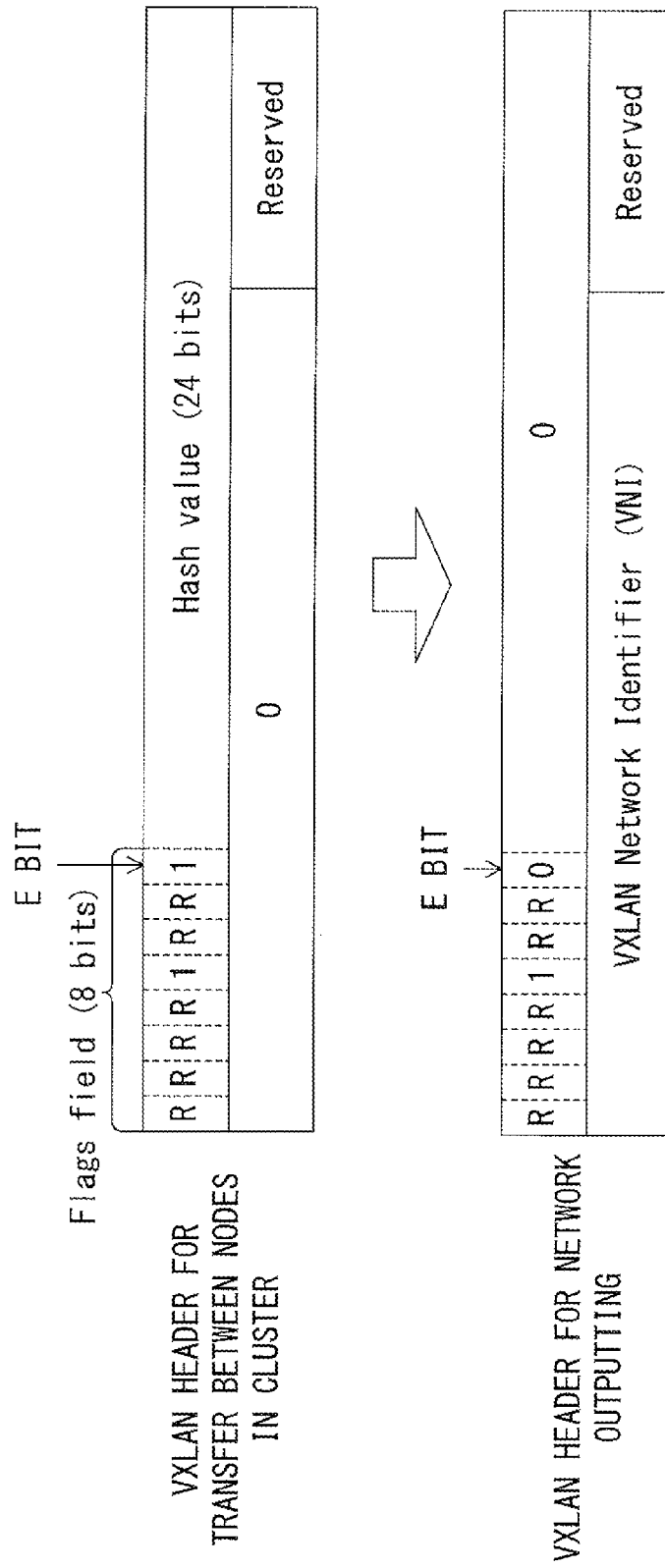
FIG. 18 illustrates a VXLAN header for transmission of a packet to a VXLAN.

FIG. 18 illustrates a VXLAN header for transmission of a packet to a VXLAN.

In the example of packet relaying illustrated in FIG. 11, the packet conversion below is performed by VTEP #1-2.

The upper table in FIG. 18 illustrates a VXLAN header of a packet received from another node in the same cluster, and the lower table illustrates a VXLAN header of a packet used for transmission to a VXLAN.

As described above, the E bit in a VXLAN header for transfer between in-cluster nodes has been set to "1", and a hash value has been set in the reserved bit.

For transmission to a VXLAN, a standard VXLAN header is used again. In other words, the E bit is changed to zero and the hash value described in the reserved bit is changed to zero. Further, the VNI obtained in the search is set in the VNI field.

Figure 19:
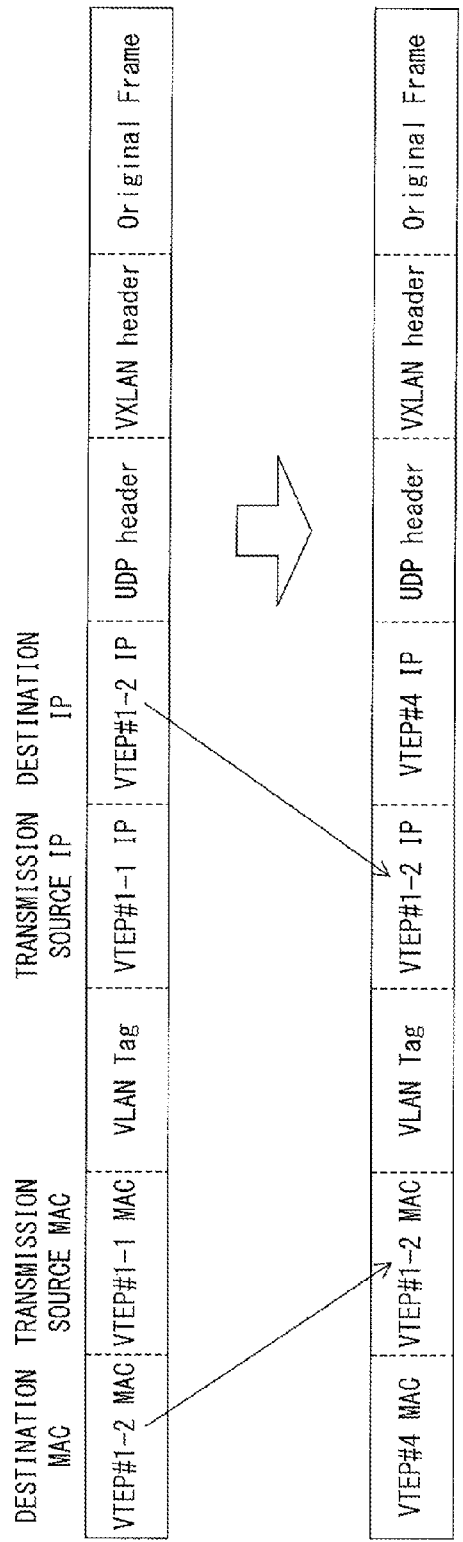
FIG. 19 illustrates a VXLAN packet for transmission of a packet to a VXLAN.

FIG. 19 illustrates a VXLAN packet for transmission of a packet to a VXLAN.

In FIG. 19, similarly to FIG. 11, a case will be explained in which VTEP #1-2 receives a packet from VTEP #1-1 and transmits the packet to VTEP #4 via a VXLAN.

The upper table in FIG. 19 illustrates a VXLAN packet received from VTEP #1-1 (before-conversion packet), and the lower table illustrates a VXLAN packet for transmission to VTEP #4 (after-conversion packet).

In the destination MAC address and the destination IP address of the outer header of an after-conversion packet, the MAC address and the IP address of VTEP #4 are described, respectively. In the transmission source MAC address and the transmission source IP address of the after-conversion packet, the destination MAC address and the destination IP address of VTEP #1-2, which are the destination MAC address and the destination IP address of the before-conversion packet, are described, respectively.

As the last description of the explanations for FIG. 16, a method of packet conversion for transfer between in-cluster nodes used in a case when Geneve is used as an overlay protocol was explained.

When a packet that has received the above conversion is to be output to an overlay network from a cluster, conversion into a standard format is performed by conducting the following processes.

The hash value portion is deleted from the option portion of a tunnel header. Then, the VNI obtained as a search result is set in the VNI field. Note that changes of the transmission address and the destination address of the outer header are similar to the case of a VXLAN.

Note that while the embodiment employs the packet format of the overlay protocol as the packet format of communications between in-cluster nodes, this is for the purpose of reducing the mounting amount of LSI (Large Scale Integration) etc., and a completely unique packet format may be used for communications between in-cluster nodes.

Also, the node 201-*i* may employ the following configuration.

Figure 20:
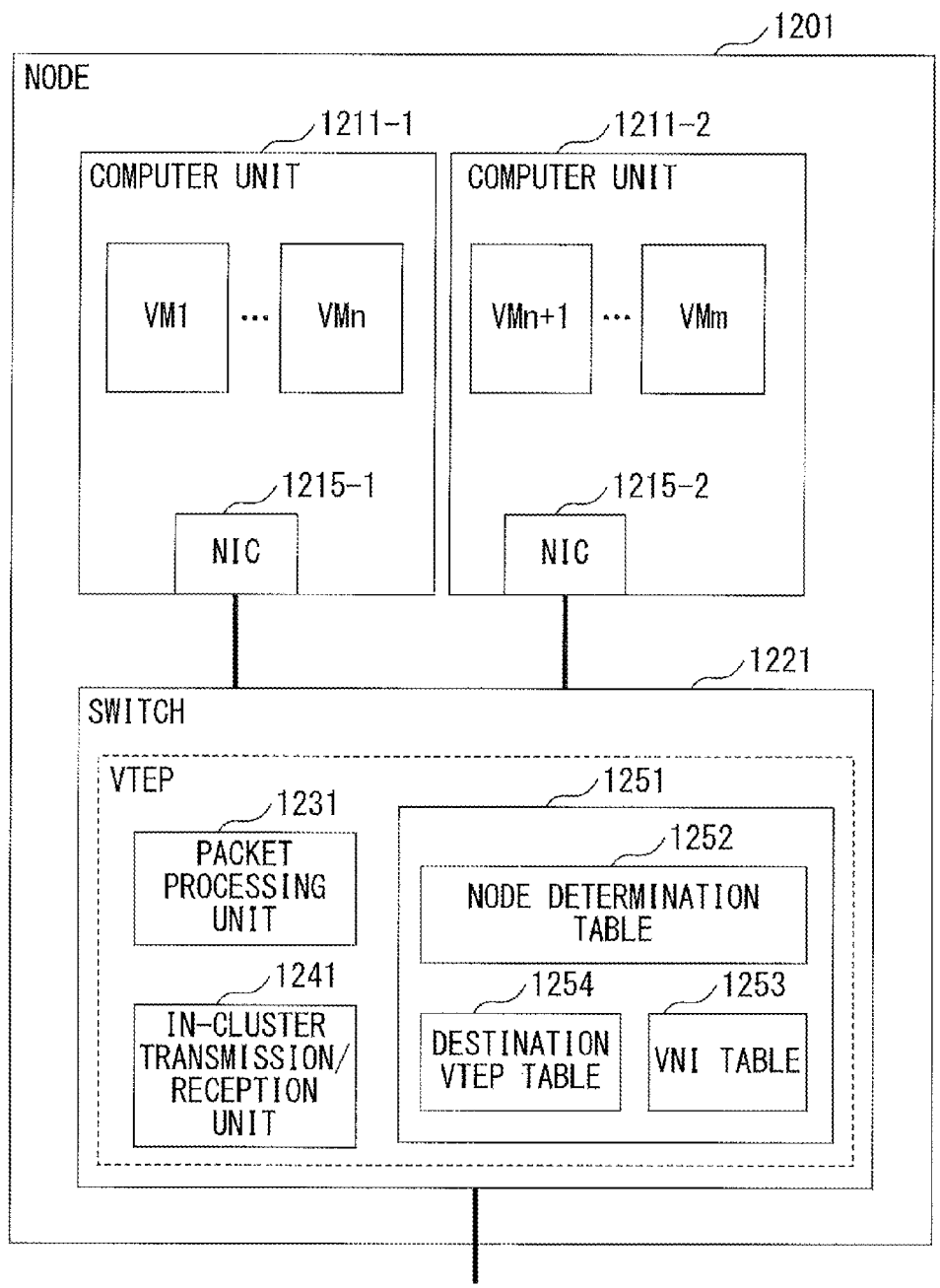
FIG. 20 illustrates a configuration diagram of anode according to another embodiment.

FIG. 20 illustrates a configuration diagram of a node according to another embodiment.

A node 1201 includes computer units 1211-*j* (*j*-1, 2) and a switch 1221. The node 1201 may be a system as illustrated in FIG. 20 instead of a single device.

The computer units 1211-*j* are hardware devices that can execute a program. In the computer units 1211-*j*, virtual machines (VMs) are executed. Note that the number of virtual machines can be arbitrary. Also, the number of the computer units 1211 can be arbitrary.

The computer units 1211-*j* include NICs 1215-*j*.

The NICs 1215-*j* conduct processes such as data conversion etc. accompanying communications. The NIC 1215-*j* are connected to the switch 1221 via a network such as a LAN etc.

The switch 1221 performs input/output (I/O) with a network such as a VXLAN etc.

The switch 1221 includes a packet processing unit 1231, an in-cluster transmission/reception unit 1241 and a storage unit 1251. The packet processing unit 1231, the in-cluster transmission/reception unit 1241 and the storage unit 1251 realize the function of a VTEP.

The storage unit 1251 stores a node determination table 1252, a VNI table 1253 and a destination VTEP table 1254.

The functions of the packet processing unit 1231, the in-cluster transmission/reception unit 1241 and the 1251 are similar to those of the packet processing unit 231-*i*, the in-cluster transmission/reception unit 241-*i* and the storage unit 251-*i*, respectively, and accordingly the explanations thereof will be omitted. The node determination table 1252, the VNI table 1253 and the destination VTEP table 1254 have configurations similar to those of the node determination tables 252-*i*, the VNI table 253-*i* and the destination VTEP table 254-*i*, respectively, and accordingly the explanations thereof will be omitted.

FIG. 21 is a hardware diagram of a node according to another embodiment.

The node 1201 includes a calculator 1218-*j* and a switch 1261.

The calculators 1218-*j* include CPUs 1212-*j*, memories 1213-*j*, storages 1214-*j* and NICs 1261-*j*.

The calculators 1218-*j* correspond to the computer units 1211-*j*. The calculators 1218-*j* are information processing apparatuses such as a server, a personal computer, etc.

The functions of the CPUs 1212-*j*, the memories 1213-*j* and the storages 1214-*j* are similar to those of the CPUs 212-*i*, the memories 213-*i* and the storages 214-*i*, and accordingly the explanations thereof will be omitted.

The NICs 1261-*j* correspond to the NICs 1215-*j*. The NICs 1261-*j* include transmission/reception ports 1217-*j*.

The transmission/reception ports 1217-*j* are interfaces that conduct transmission and reception of a packet.

The switch 1261 corresponds to the switch 1221. The switch 1261 includes an 802.1Q switch chip 1262, a processing circuit 1263, a memory 1264 and transmission/reception ports 1265 and 1266-*j*.

The 802.1Q switch chip 1262 performs processes based on IEEE 802.1Q, which is a standard for network.

The processing circuit 1263 corresponds to the packet processing unit 1231 and the in-cluster transmission/reception unit 1241. Also, the processing circuit 263-*i* may be a processor that executes a program stored in the memory 1264.

The memory 1264 corresponds to the storage unit 1251.

The functions of the processing circuit 1263, the memory 1264, the transmission/reception ports 1265 and 1266-*j* are similar to those of the processing circuits 263-*i*, the memories 264-*i* and the transmission/reception ports 265-*i*, and accordingly the explanations thereof will be omitted.

According to the information processing system of an embodiment, it is possible to use all destination VTEP tables included in a cluster without duplication in a packet conversion process and to increase the number of entries of the tables of the entire information processing system. This makes it possible to construct a large-scale system while using hardware off-load.

According to an information processing system of an embodiment, a first node to have received a packet calculates a hash value used for searching destination VTEP tables and the hash value is added to a packet for transmission to a different node in a cluster, making it unnecessary to calculate a hash value again and making it possible to search a destination VTEP table in a different node at a high speed.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system including a plurality of information processing apparatuses, wherein
   a first information processing apparatus among the plurality of information processing apparatuses comprises:
   a first memory configured to store a first destination information table in which first destination information and first specific destination information that corresponds to the first destination information are associated; and
   a first processing circuit configured to calculate a hash value on a basis of destination information included in a first packet received from a virtual machine, to search the first destination information table, to select a second information processing apparatus on a basis of the calculated hash value when a search target entry does not exist, to generate a second packet that is a result of the hash value added and specifying information to specify the first information processing apparatus, to transmit the second packet to the second information processing apparatus, and a second information processing apparatus among the plurality of information processing apparatuses includes:
   a second memory configured to store a second destination information table in which second destination information and second specific destination information that corresponds to the second destination information are associated; and
   a second processing circuit configured to receive the second packet transmitted by the first processing circuit, and to transmit to a destination represented by the second specific destination information a third packet that is a result of the second packet converted by using the second specific destination information obtained by searching the second destination information table on a basis of the hash value included in the second packet.

2. The information processing system according to claim 1, wherein
   the first memory further stores a node determination table that includes a plurality of entries including identification information for identifying the plurality of information processing apparatuses; and
   the first processing circuit selects the second information processing apparatus that corresponds to identification information obtained by searching the node determination table on a basis of the calculated hash value from among the plurality of information processing apparatuses when the search target entry does not exist.

3. The information processing system according to claim 1, wherein
   the first processing circuit further adds, to the second packet, control information indicative of the hash value is included; and
   the second processing circuit determines whether or not to search the second destination information table on a basis of the control information included in the second packet.

4. A first information processing apparatus among a plurality of information processing apparatuses in an information processing system including the plurality of information processing apparatuses, the first information processing apparatus comprising:
   a first memory configured to store a first destination information table in which destination information and specific destination information that corresponds to the destination information are associated; and
   a first processing circuit configured to calculate a hash value on a basis of destination information included in a first packet received from a virtual machine, to search the first destination information table, to select a second information processing apparatus from among the plurality of information processing apparatuses on a basis of the calculated hash value when a search target entry does not exist, to generate a second packet that is a result of the hash value added and specifying information to specify the first information processing apparatus, to transmit the second packet to the second information processing apparatus.

5. The information processing apparatus according to claim 4, wherein
   the first memory further stores a node determination table that includes a plurality of entries including identification information for identifying the plurality of information processing apparatuses; and
   the first processing circuit and selects the second information processing apparatus that corresponds to identification information obtained by searching the node determination table on a basis of the calculated hash value from among the plurality of information processing apparatuses when the search target entry does not exist.

6. The information processing apparatus according to claim 4, wherein the first processing circuit further adds, to the second packet, control information indicative of the hash value is included.

7. A control method of an information processing system including a plurality of information processing apparatuses, the control method comprising:
    calculating, by a first processing circuit included in a first information processing apparatus among the plurality of information processing apparatuses, a hash value on a basis of destination information included in a first packet received from a virtual machine and to search a first destination information table in which first destination information and first specific destination information that corresponds to the first destination information are associated;
    selecting, by the first processing circuit, a second information processing apparatus on a basis of the calculated hash value when a search target entry does not exist;
    generating, by the first processing circuit, a second packet that is a result of the hash value added and specifying information to specify the first information processing apparatus;
    transmitting, by the first processing circuit, the second packet to the second information processing apparatus;
    receiving, by a second processing circuit included in a second information processing apparatus among the plurality of information processing apparatuses, the second packet;
    searching, by the second processing circuit, on a basis of the hash value included in the second packet, a second destination information table in which second destination information and second specific destination information that corresponds to the second destination information are associated; and
    transmitting, by the second processing circuit, to a destination represented by the second specific destination information a third packet that is a result of the second packet converted by using the second specific destination information obtained by searching the second destination information table.

8. The control method according to claim 7, wherein the first information processing apparatus is configured:
    to store further a node determination table that includes a plurality of entries including identification information for identifying the plurality of information processing apparatuses; and
    in the selecting the second information processing apparatus, to select the second information processing apparatus that corresponds to identification information obtained by searching the node determination table on a basis of the calculated hash value from among the plurality of information processing apparatuses when the search target entry does not exist.

9. The control method according to claim 7, wherein
    the first information processing apparatus further adds, to the second packet, control information indicative of the hash value is included; and
    the second information processing apparatus determines whether or not to search the second destination information table on a basis of the control information included in the second packet.

\* \* \* \* \*